US008724859B2

(12) United States Patent
Schneider et al.

(10) Patent No.: US 8,724,859 B2
(45) Date of Patent: May 13, 2014

(54) FINGERPRINT SCANNER AND METHOD HAVING AN ACOUSTIC DETECTOR

(75) Inventors: John K. Schneider, Snyder, NY (US); Jack C. Kitchens, Tonawanda, NY (US)

(73) Assignee: QUALCOMM Incorporated, San Diego, CA (US)

( * ) Notice: Subject to any disclaimer, the term of this patent is extended or adjusted under 35 U.S.C. 154(b) by 1713 days.

(21) Appl. No.: 11/040,836

(22) Filed: Jan. 21, 2005

(65) Prior Publication Data

US 2005/0163353 A1    Jul. 28, 2005

Related U.S. Application Data

(60) Provisional application No. 60/538,585, filed on Jan. 23, 2004.

(51) Int. Cl.
*G06K 9/00*    (2006.01)

(52) U.S. Cl.
USPC .......................... 382/124; 382/126; 382/127

(58) Field of Classification Search
USPC ................ 382/124, 126, 127, 313, 314, 315; 340/5.52, 5.53, 5.82, 5.83, 356; 358/496–497, 486; 250/234
See application file for complete search history.

(56) References Cited

U.S. PATENT DOCUMENTS

| 3,778,756 | A  |   | 12/1973 | Houston et al. |
|-----------|----|---|---------|----------------|
| 4,385,831 | A  |   | 5/1983  | Ruell |
| 5,224,174 | A  | * | 6/1993  | Schneider et al. ............ 382/124 |
| 5,563,345 | A  | * | 10/1996 | Kersten et al. ................. 73/602 |
| 5,589,636 | A  | * | 12/1996 | Bicz ................................ 73/617 |
| 5,689,576 | A  | * | 11/1997 | Schneider et al. ............ 382/124 |
| 6,164,135 | A  | * | 12/2000 | Bicz ................................ 73/602 |
| 6,552,841 | B1 | * | 4/2003  | Lasser et al. .................. 359/305 |
| 6,959,602 | B2 | * | 11/2005 | Peterson et al. ................ 73/602 |
| 2002/0085742 | A1 | * | 7/2002 | Bablumyan et al. .......... 382/124 |
| 2003/0039432 | A1 | * | 2/2003 | Holmes ............................ 385/16 |
| 2003/0217599 | A1 | * | 11/2003 | Peterson et al. ................ 73/602 |
| 2004/0237669 | A1 | * | 12/2004 | Hayward et al. ......... 73/862.624 |
| 2005/0163353 | A1 |   | 7/2005 | Schneider et al. |

FOREIGN PATENT DOCUMENTS

WO    WO 2006/042144 A2    4/2006

* cited by examiner

*Primary Examiner* — Brian Le
(74) *Attorney, Agent, or Firm* — Hodgson Russ LLP (57) ABSTRACT

The invention may include a fingerprint scanner having an ultrasonic wave emitter, a platen, an acoustic splitter and an acoustic detector. The invention may also include a method of scanning a fingerprint, wherein ultrasonic energy is provided and reflected with an acoustic splitter to provide first reflected energy, the first reflected energy may be reflected from a finger to provide second reflected energy, the second reflected energy may be received at the splitter, and allowed to pass through the splitter, and the second reflected energy may then be received at a detector.

16 Claims, 9 Drawing Sheets

FINGERPRINT SCANNER AND METHOD HAVING AN ACOUSTIC DETECTOR

CROSS-REFERENCE TO RELATED APPLICATION

This application claims the benefit of priority to U.S. provisional patent application Ser. No. 60/538,585, filed on Jan. 23, 2004.

FIELD OF THE INVENTION

The present invention relates to devices and methods of scanning a fingerprint.

BACKGROUND OF THE INVENTION

For the purposes of discussion, the term "fingerprint" will mean the skin surface friction ridge detail of a single fingerprint, partial fingerprint or any portion of the skin surface friction ridge of up to and including the entire hand. Fingerprint information has been collected from human fingers by means of ink and paper. In recent years various electronic fingerprint scanning systems have been developed utilizing optical, capacitance, direct pressure, thermal and acoustic methods. Optical systems often employ CCD (charge coupled device) arrays to detect light reflected from the surface being imaged. Capacitance systems often inject a radio frequency signal into the skin/tissue and image the finger by reading the attenuated radio frequency signal radiating from the fingerprint ridges. Direct pressure systems often utilize an array of pressure sensing elements in contact with the finger and map a pressure gradient field. Thermal systems often detect temperature differences between air trapped between ridges of a fingerprint and the skin corresponding to the ridges in order to produce a thermal image.

Acoustic or ultrasound scanning devices and methods often employ a piezoelectric transducer that sends a wave or pulse through an acoustic transmitting media. The pulse then partially reflects back at each media interface. The reflected pulse is detected by a sensing element in the transducer. By knowing the time that lapsed between sending and detecting the pulse, the distance traveled by the pulse for each reflecting surface may be determined. Range gating (biasing) this signal in time may be used to know which reflected signals correspond to the fingerprint, and which do not. By knowing the time that lapsed between sending and receiving, it is possible to determine whether a ridge of the fingerprint or a valley of the fingerprint reflected the signal. Ridges in the fingerprint will have a shorter lapsed time than valleys in the fingerprint. By knowing whether a ridge or a valley reflected the signal, and by knowing the position of the transducer, an image of the friction-ridge may be created.

SUMMARY OF THE INVENTION

The present invention may include an ultrasonic detector for capturing information that may be used to produce an accurate fingerprint image. Such a detector may include a piezoelectric charge coupled device having a piezoelectric layer, a charge coupled device and electric circuitry to communicate information from the mechanism to a receiver. The piezoelectric layer may be capable of producing electric charges at locations which receive an ultrasonic signal. The charge coupled device may be in communication with the piezoelectric layer and capable of producing an electric current corresponding the electric charges produced by the piezoelectric layer. The electric circuitry may be in communication with the charge coupled device and capable of communicating to a receiver the electric currents produced by the charge coupled device.

The present invention may be embodied as a fingerprint scanner having an ultrasonic wave emitter, a platen, an acoustic splitter and an acoustic detector. The platen may be capable of supporting a finger and allowing ultrasonic waves to pass through the platen. The acoustic splitter may be positioned to reflect ultrasonic waves from the emitter toward the platen. The acoustic splitter may also be positioned to allow passage of ultrasonic waves reflected from a finger on the platen. The acoustic detector may be positioned to receive ultrasonic waves that passed through the splitter. The detector may provide signals corresponding to the received energy to a computer, which is programmed to interpret the signals and provide an image of the fingerprint. The detector may be a piezoelectric charge coupled device.

The invention may be embodied as a method of analyzing a fingerprint, wherein ultrasonic energy is provided and reflected with an acoustic splitter to provide first reflected energy. The first reflected energy may be reflected from a finger to provide second reflected energy. The second reflected energy may be received at the splitter, and allowed to pass through the splitter. The second reflected energy may then be received at the detector. Receipt at the detector may include receiving the energy on a piezoelectric element and producing a charge with that element, and then communicating a signal corresponding to the charge which may be used to produce an image of a portion of the fingerprint.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
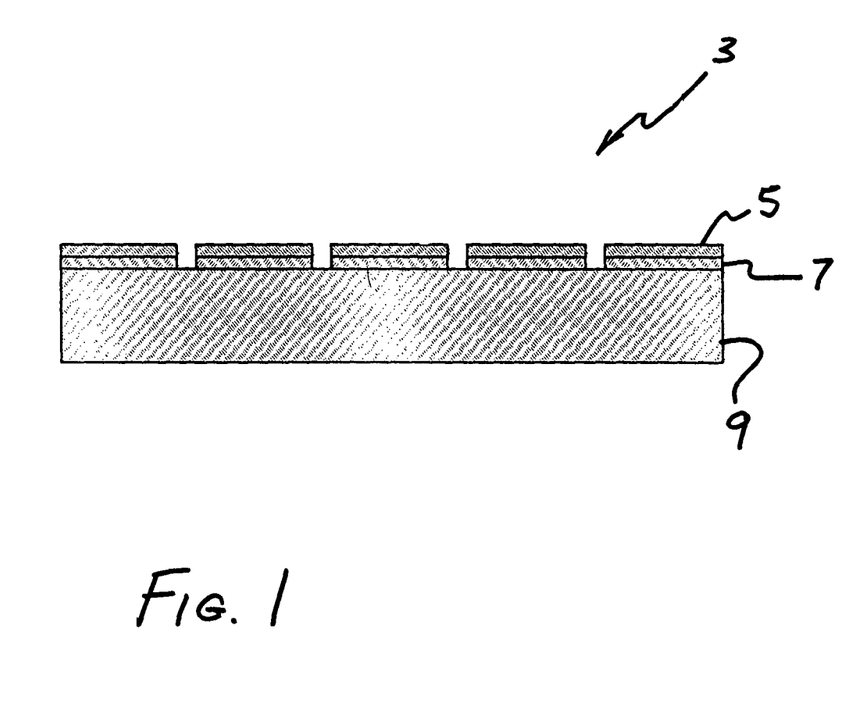
FIG. 1, which depicts a piezoelectric charge coupled device.

The present invention may include an ultrasonic device for capturing information that may be used to produce an accurate fingerprint image. A detector used in such a device may use a piezoelectric charge coupled device 3 ("PCCD"). FIG. 1 depicts such a PCCD. The PCCD 3 may be similar to an optical charge coupled device ("OCCD"), with the difference being that the photosensitive surface layer of each sensing element in the OCCD is replaced by a piezoelectric layer 5 so that dynamic pressure waves impinging upon each piezoelectric element produce the electric charge needed for the device to function.

The PCCD may include a piezoelectric layer 5 which is capable of producing electric charges at elements which receive an ultrasonic signal. In communication with the piezoelectric layer 5 may be a charge coupled device 7. The charge coupled device 7 may produce electric currents corresponding to the electric charges produced by the piezoelectric layer 5. An electric circuit 9 may be in communication with the charge coupled device 7 and capable of communicating to a receiver, such as a computer. The communications from the electric circuit may be in the form of electric currents provided to the receiver.

The PCCD 3 may offer an improvement over phased array ultrasonic devices in that the PCCD 3 may have the ability to image a large number of pixel areas simultaneously. The PCCD 3 may be in the form of a line array or may be in the form of an area array. The PCCD 3 may be utilized with direct contact imaging systems, or may be used through an insulating media or in a beam splitter configuration.

Figure 2:
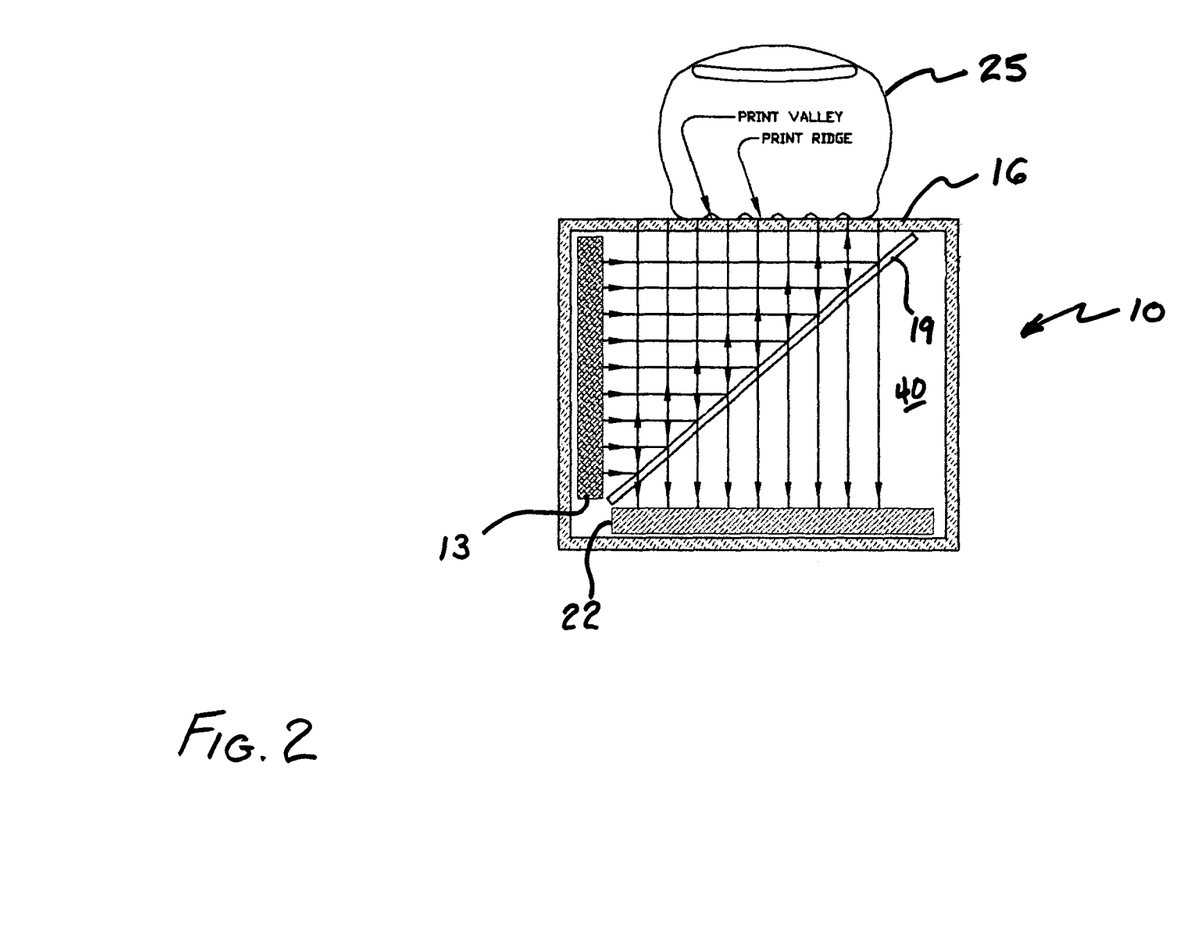
FIG. 2, which depicts a scanner having a large-area emitter and a large area detector.
Figure 3:
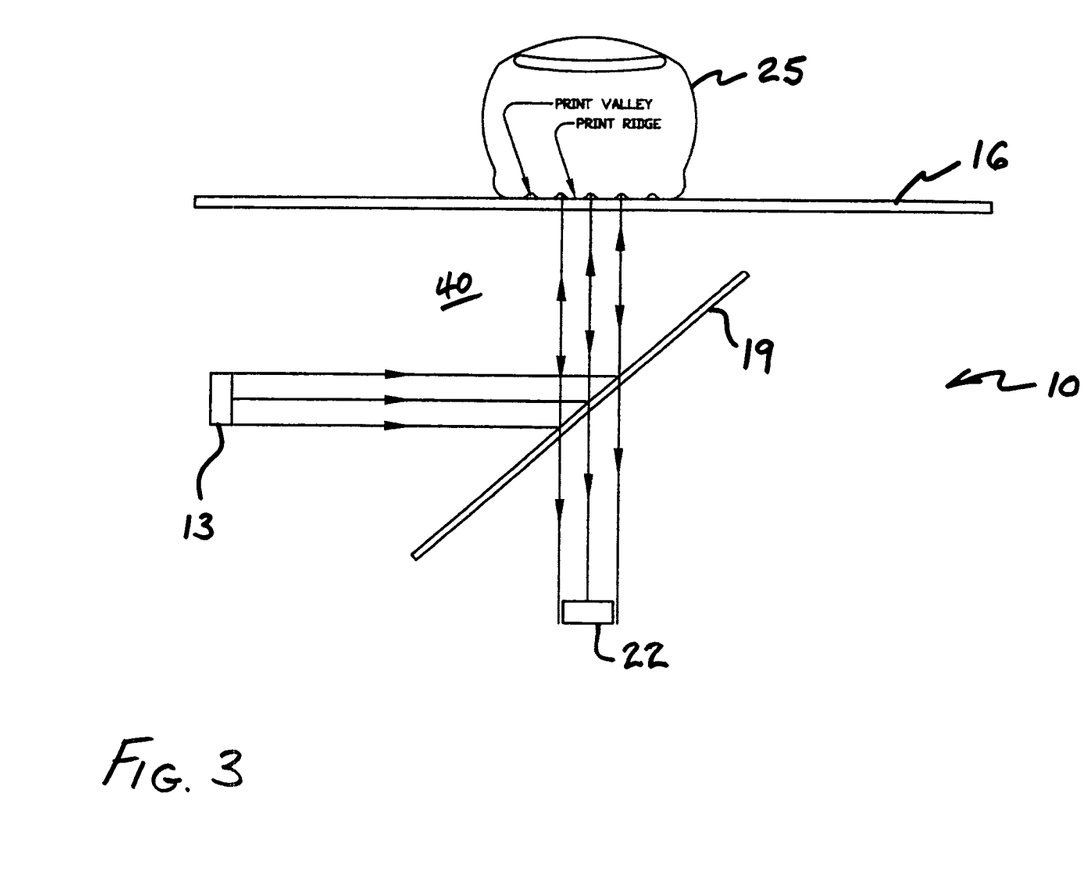
FIG. 3, which depicts a scanner having a small-area emitter and a small-area detector.

FIG. 2 depicts an embodiment of a scanner according to the invention. In FIG. 2 there is shown a fingerprint scanner 10 having an ultrasonic wave emitter 13, a platen 16, an acoustic splitter 19 and an acoustic detector 22. The platen 16 may be a substantially planar piece of polycarbonate suitable for supporting a finger 25 and for allowing ultrasonic waves to pass through the platen 16. The acoustic splitter 19 may be positioned to reflect ultrasonic waves from the emitter 13 toward the platen 16. The splitter 19 may be a substantially planar piece of crosslinked polystyrene. The splitter's position may be such that ultrasonic waves reflected from a finger 25 on the platen 16 are allowed to pass through the splitter 19. The detector 22 may be positioned to receive ultrasonic waves that passed through the splitter 19. The acoustic detector 22 may be a PCCD 3. FIG. 3 depicts an embodiment similar to that shown in FIG. 2, except that in FIG. 3 the emitter 13 and the detector 22 are smaller.

Figure 4:
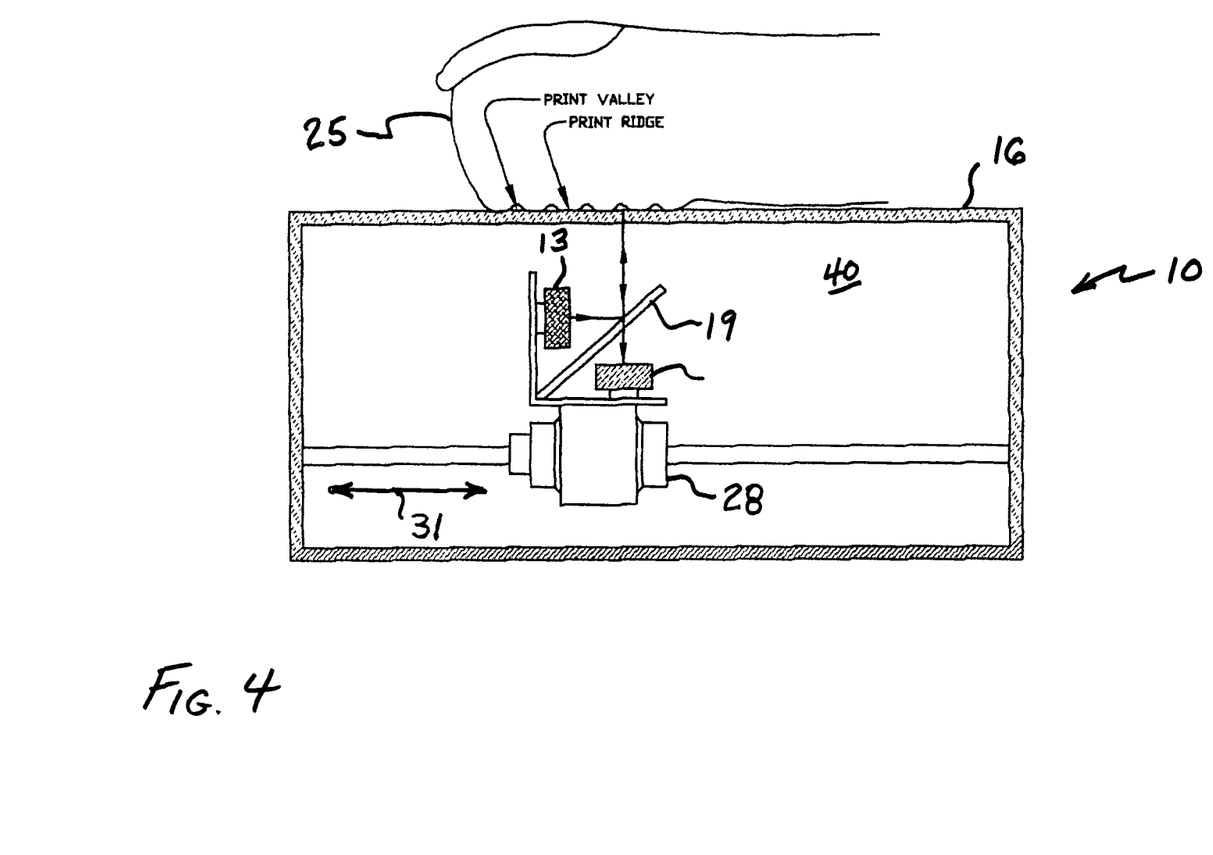
FIG. 4, which depicts a scanner having a small-area emitter and a small area detector mounted on a carriage.

FIG. 4 depicts an embodiment of the invention which has a movable carriage 28. The arrowed line 31 indicates how the carriage 28 might move. The emitter 13, splitter 19 and detector 22 may be supported by the carriage 28. During a scanning operation, the carriage 28 may move so as to acoustically illuminate small sections of the finger 25 at any particular time. Information provided by the detector 22 at a particular time may be coupled with an indication of the carriage position to provide a set of fingerprint information. Once a number of these sets are obtained, an image of the fingerprint may be produced by displaying each piece of information in a location related to the corresponding carriage position.

Figure 5:
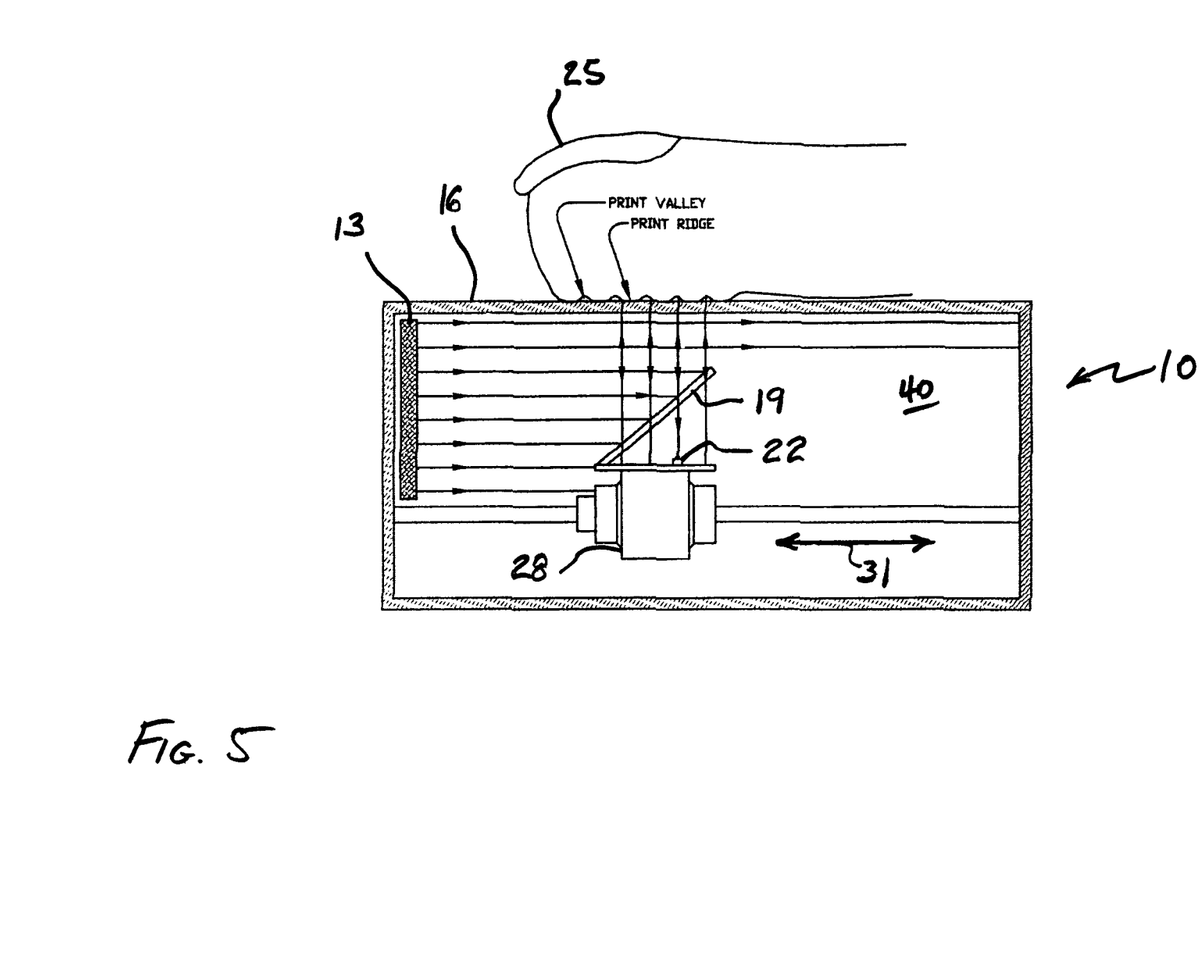
FIG. 5, which depicts a scanner having a linearly distributed detector mounted on a carriage.

FIG. 5 depicts an embodiment of the invention in which the detector 22 is linearly distributed. If the carriage 28 is provided, then as the carriage 28 moves, a line of fingerprint information may be generated at a particular time. The linearly distributed detector 22 may be distributed substantially perpendicular to the direction 31 in which the carriage moves.

Figure 6:
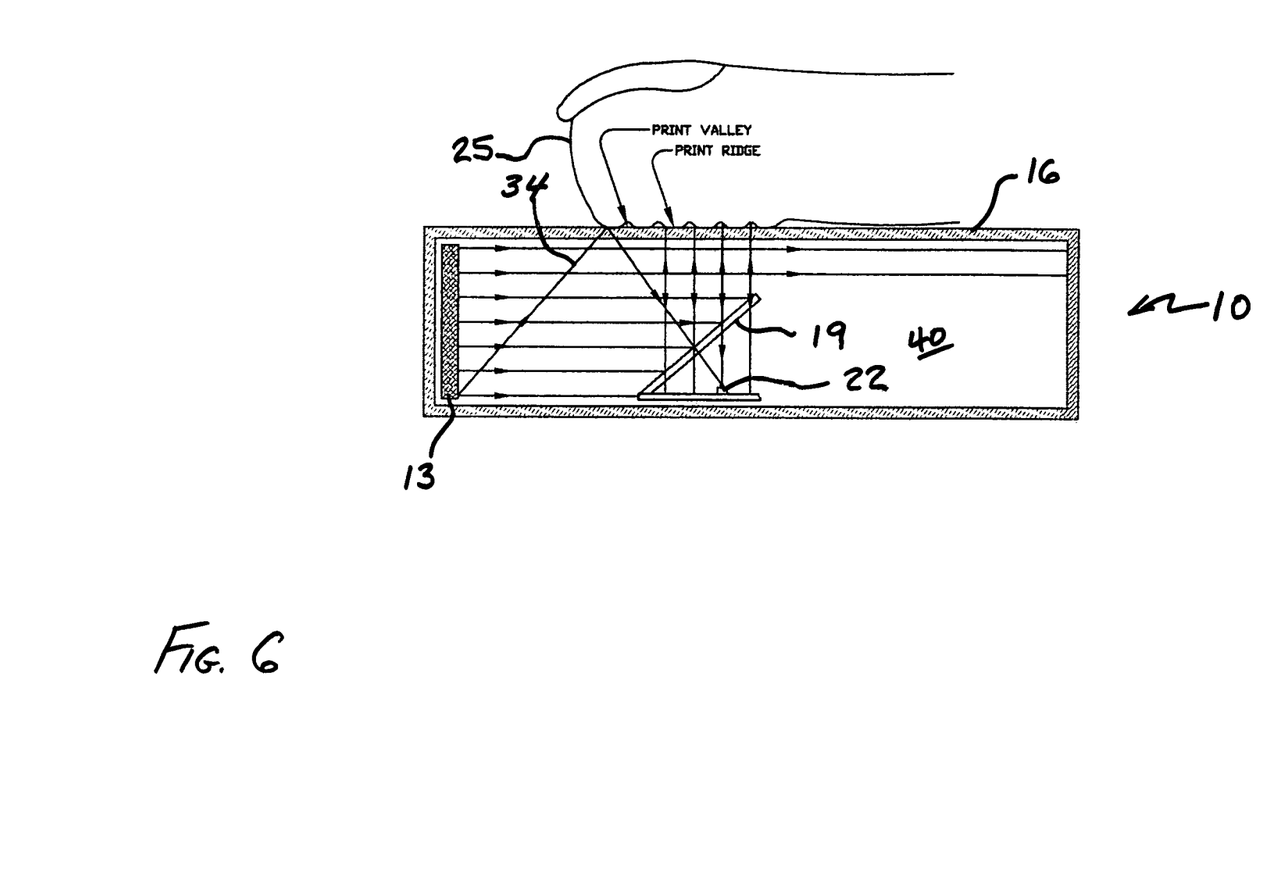
FIG. 6, which depicts a scanner having a linearly distributed detector which is capable of detecting finger movement using Doppler shift.

FIG. 6 depicts an embodiment of the invention in which the scanner 10 includes a linearly distributed detector 22, but no carriage. In this embodiment, a finger 25 may be moved across the platen 16, and the finger position may be tracked. Tracking finger position may be accomplished using optical or acoustic devices that detect Doppler shift, for example the Doppler shift corresponding to energy represented by the angled ray 34.

Figure 7:
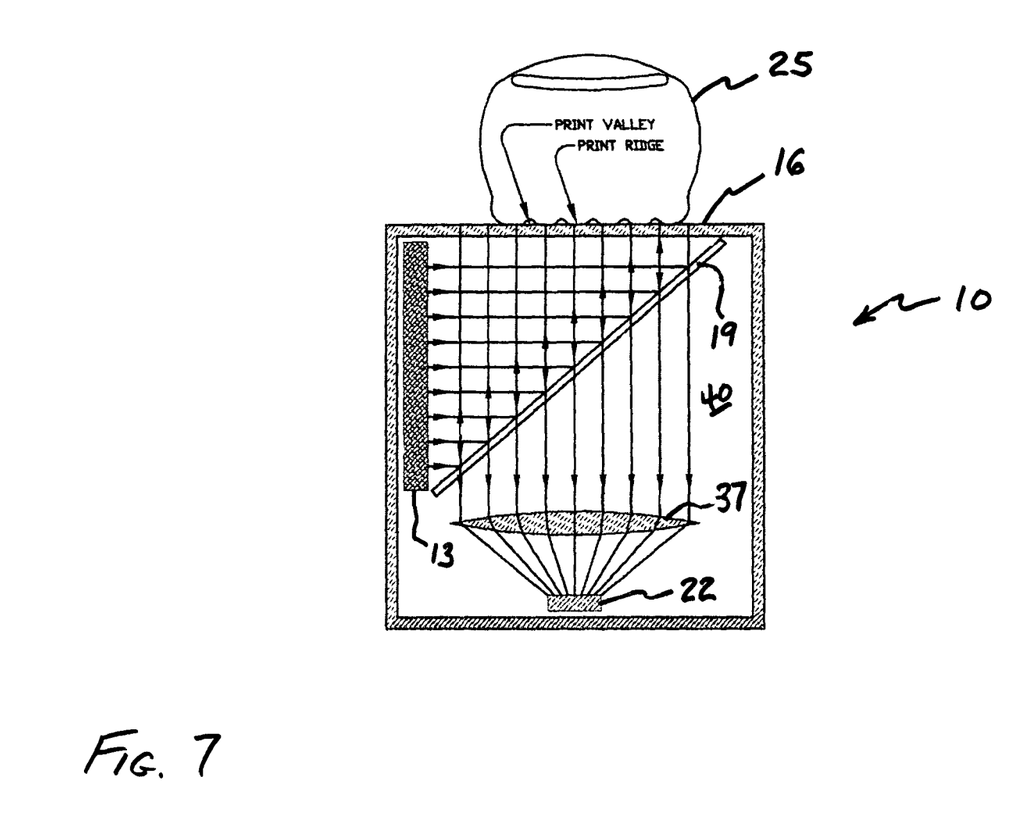
FIG. 7, which depicts a scanner having a lens between the splitter and the detector.

FIG. 7 depicts an embodiment of the invention in which the scanner 10 has an acoustic lens 37, or series of lenses, positioned between the splitter 19 and the detector 22. The lens 37 may be used to focus ultrasonic energy on the detector 22. In such a device, the detector 22 may be smaller than a detector in a device that does not have a lens 37. Examples of materials that may be used as an acoustic lens 37 include cross-linked polystyrene and polycarbonate. Fluids, such as mineral oil, may also be used.

Figure 8:
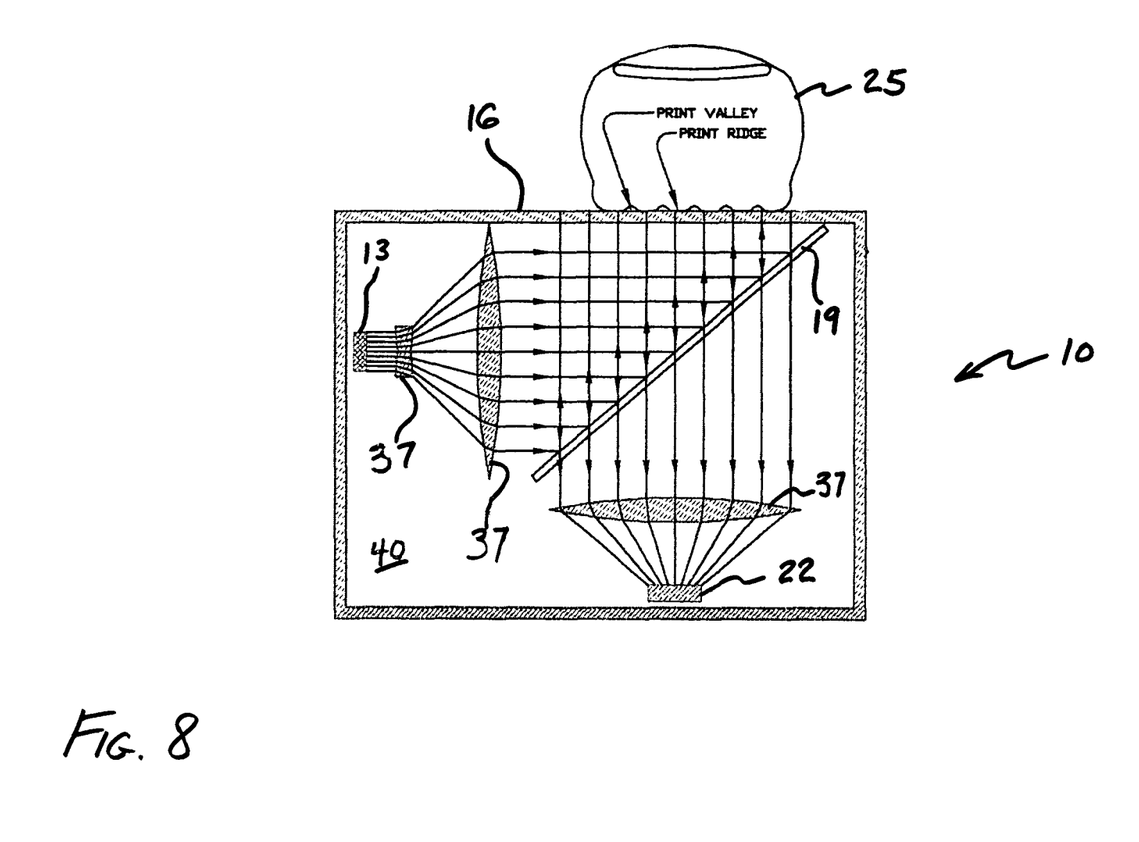
FIG. 8, which depicts a scanner having a series of lenses between the emitter and the splitter.

FIG. 8 depicts an embodiment of the invention in which the scanner has an acoustic lens 37, or series of lenses, positioned between the emitter 13 and the splitter 19. The lens 37 may be used to disburse ultrasonic energy and thereby acoustically illuminate a larger surface area than would be the case without the lens 37. In such a device, the emitter 13 may be smaller than that required by a scanner 10 that does not have a lens 37.

An ultrasound transmission media 40 may be placed between the emitter 13 and the splitter 19 to allow efficient transmission of ultrasound. The ultrasound transmission media 40 may also be placed between the splitter 19 and the platen 16. The ultrasound transmission media 40 may also be placed between the splitter 19 and the detector 16. A suitable ultrasound transmission media 40 may be mineral oil.

Figure 9:
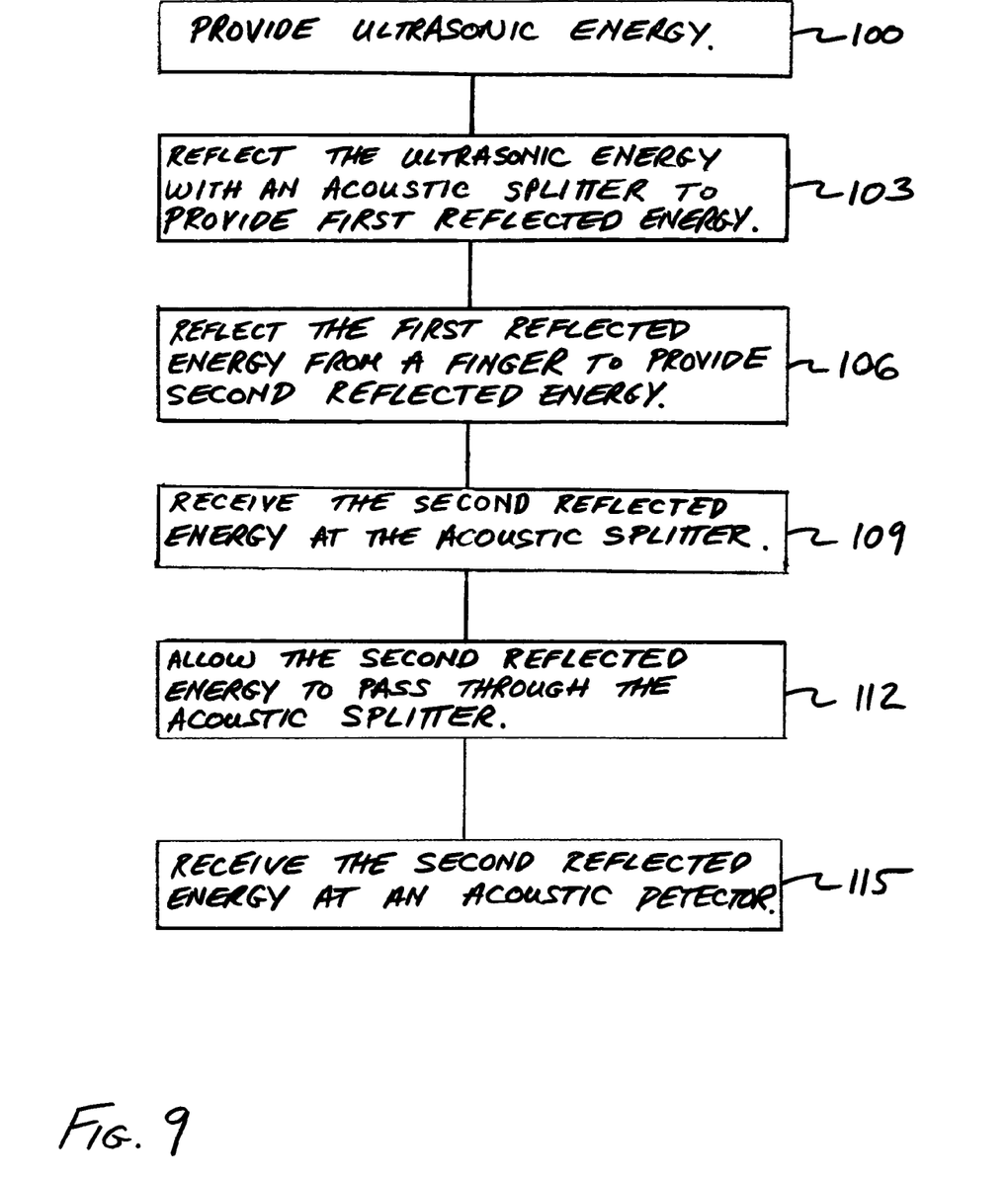
FIG. 9 is a flow chart depicting a method according to the invention.

FIG. 9 depicts a method in accordance with the invention. In that method, ultrasonic energy may be provided 100 and reflected 103 from an acoustic splitter. The acoustic splitter may not reflect all of the energy that it receives—some of the energy may pass through the splitter. The energy reflected from the splitter is referred to herein as "first reflected energy".

The first reflected energy may be reflected 106 from a finger, which may be resting on the platen. The finger may not reflect all of the energy that it receives—some of the energy may be absorbed by the finger. The energy reflected from the finger is referred to herein as "second reflected energy".

The second reflected energy may be received 109 at the splitter and allowed to pass 112 through the splitter. The acoustic splitter may not pass all of the second reflected energy that it receives—some of the second reflected energy may be reflected by the splitter. The second reflected energy may then be received 115 at an acoustic detector. Having received 115 the second reflected energy at the detector, the detector may provide signals to a computer which is programmed to interpret the signals and provide an image of the fingerprint.

Other embodiments of a method according to the invention may include moving the splitter and the detector while the second reflected energy is received. For example, the movable carriage described above may be used to accomplish this task. Still other embodiments of the invention may include focusing the second reflected energy on the detector, or the ultrasonic energy may be focused on the splitter, or both.

Provisional patent application No. 60/538,585 provides information related to the invention and describes embodiments of the invention. That provisional patent application is incorporated herein by reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A fingerprint scanner comprising:
   an ultrasonic wave emitter;
   a platen capable of supporting a finger and allowing ultrasonic waves to pass through the platen;

an acoustic splitter positioned to reflect ultrasonic waves from the emitter toward the platen, and positioned to allow passage of ultrasonic waves reflected from a finger on the platen;

an acoustic lens positioned between the emitter and the splitter and configured to cause ultrasonic energy passing through the lens from the emitter toward the splitter to diverge and thereby acoustically illuminate a larger surface area; and an acoustic detector positioned to receive ultrasonic waves that passed through the splitter.

2. The scanner of claim 1, further comprising a movable carriage supporting the emitter, the splitter and the detector.

3. The scanner of claim 2, wherein the detector is linearly distributed substantially perpendicular to a direction in which the carriage is movable.

4. The scanner of claim 1, further comprising an acoustic lens positioned between the splitter and the detector.

5. The scanner of claim 1, wherein the detector comprises:
a piezoelectric layer capable of producing electric charge at locations which receive an ultrasonic signal;
a charge coupled device in communication with the piezoelectric layer and capable of producing an electric current corresponding the electric charge produced by the piezoelectric layer;
an electric circuit in communication with the charge coupled device and capable of communicating to a receiver the electric currents produced by the charge coupled device.

6. The scanner of claim 1, wherein the detector is a piezoelectric charge coupled device.

7. The scanner of claim 1, herein the piezoelectric charge coupled device is linearly distributed.

8. The scanner of claim 1, further comprising a fluidic ultrasound transmission media between the emitter and the splitter.

9. The scanner of claim 1, further comprising a fluidic ultrasound transmission media between the splitter and the platen.

10. The scanner of claim 1, further comprising a fluidic ultrasound transmission media between the splitter and the detector.

11. A method of analyzing a finger, comprising:
providing ultrasonic energy;
directing the ultrasonic energy through an acoustic lens to provide refracted energy, the lens being configured to cause ultrasonic energy passing through the lens towards an acoustic splitter to diverge;
reflecting the refracted energy with the acoustic splitter to provide first reflected energy;
reflecting the first reflected energy from a finger to provide second reflected energy;
receiving the second reflected energy at the acoustic splitter;
allowing the second reflected energy to pass through the acoustic splitter; and
receiving the second reflected energy at an acoustic detector.

12. The method of claim 11, further comprising moving the splitter and the detector while receiving the second reflected energy.

13. The method of claim 11, further comprising focusing the second reflected energy on the detector.

14. The method of claim 11, further comprising focusing the ultrasonic energy on the splitter.

15. The method of claim 11, wherein receiving the second reflected energy at an acoustic detector includes receiving the second reflected energy on a piezoelectric element, and producing a charge from the element.

16. The method of claim 15, further comprising detecting the charge and communicating a signal corresponding to the charge.

* * * * *